Feb. 27, 1923.

O. C. OLNEY.
NONGLARE SHADE FOR AUTOMOBILE LAMPS.
FILED OCT. 7, 1921.

1,446,925.

INVENTOR:
Oscar C. Olney
BY James A. Ramsey
ATTORNEY

Patented Feb. 27, 1923.

1,446,925

UNITED STATES PATENT OFFICE.

OSCAR C. OLNEY, OF LIMA, OHIO.

NONGLARE SHADE FOR AUTOMOBILE LAMPS.

Application filed October 7, 1921. Serial No. 506,133.

*To all whom it may concern:*

Be it known that I, OSCAR C. OLNEY, a citizen of the United States, residing at Lima, in the county of Allen and State of Ohio, have invented certain new and useful Improvements in Nonglare Shades for Automobile Lamps, of which the following is a specification.

My invention relates to non-glare shades for automobile lamps and the like, adapted to cast a shade over that part of the reflector which reflects light rays in undesirable directions and thereby prevent glare and confine reflections of the light below a certain height above the roadway.

Serious accidents have been caused by the intense beams of light from automobile head lamps, blinding and confusing persons crossing thoroughfares. A great part of this illumination is unnecessary, as no advantage is gained by that part of the illumination which does not strike the roadway or its immediate surroundings.

The object of my invention is to avoid accidents by preventing glare from automobile head lights; further, to prevent illumination reaching that part of the reflector which reflects the rays of light in undesirable directions; further, to prevent the light being reflected above a certain height over the roadway; further, to provide a greatly simplified device for this purpose; further, to provide means whereby this device is firmly held in position about the electric light globe in an automobile lamp.

My invention consists in the provision of a detachable hood adapted to be held about an incendescent lamp globe of an automobile lamp by spring tension, whereby glare is avoided by preventing light being reflected in undesirable directions or above a predetermined height over the roadway.

My invention further consists in the compact construction, combination, arrangement and formation of the several parts, and in the details of construction as herein set forth and claimed.

Figure 1:
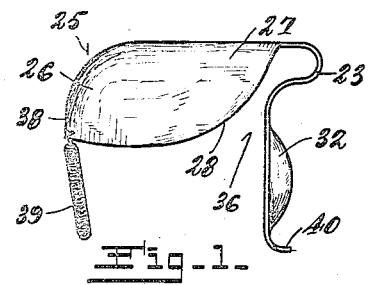
Fig. 1 is a side elevation of my improved device.
Figure 2:
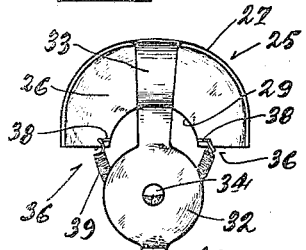
Fig. 2 is a front end elevation of the same.
Figure 3:
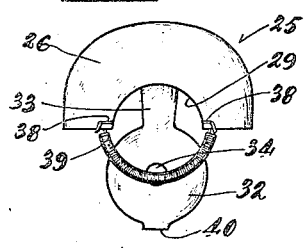
Fig. 3 is a rear elevation.
Figure 4:
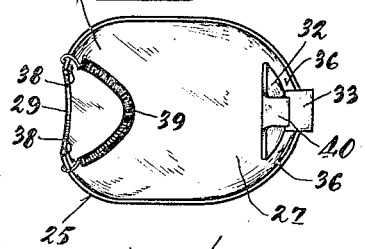
Fig. 4 is a bottom view.
Figure 5:
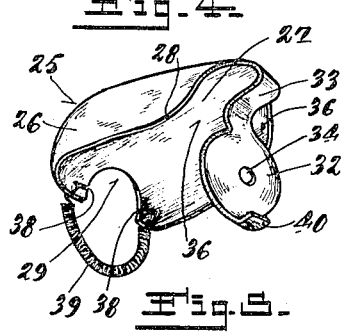
Fig. 5 is a bottom perspective view.
Figure 6:
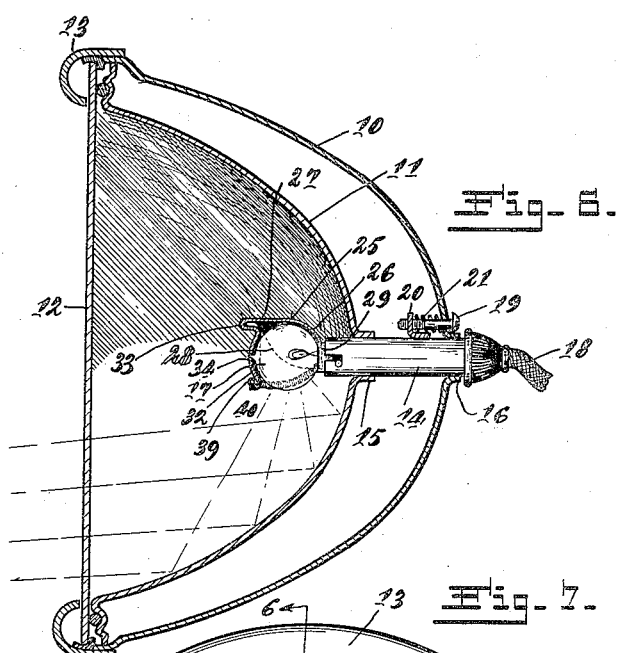
Fig. 6 is a vertical cross section of an automobile head lamp having my improved device applied thereto and taken on the line 6—6 of Fig. 7.
Figure 7:
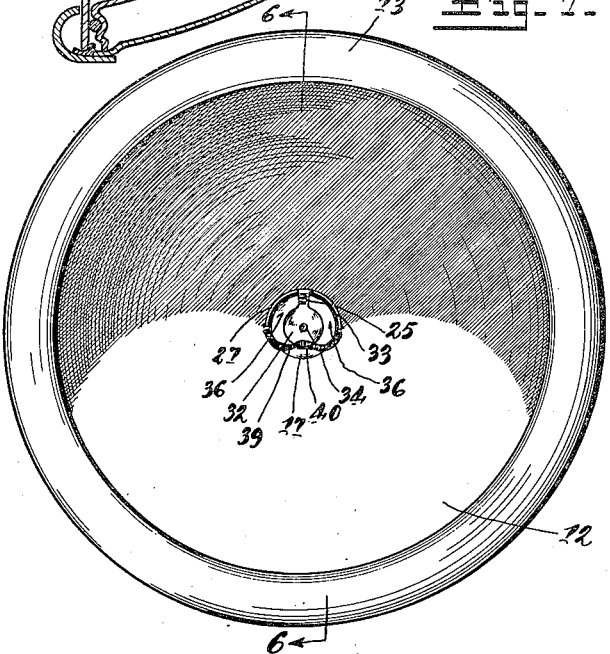
Fig. 7 is a front elevation of the same.

In the embodiment of my invention as illustrated, an automobile lamp comprises outer shell 10 having reflector 11 mounted therein. A glass plate 12 carried in removable rim 13 is secured to the outer shell in front of the reflector. A socket 14 adjustable endwise in bearings 15 and 16 respectively of reflector 11 and outer shell 10, has an incandescent lamp globe 17 secured in the front end thereof in any usual manner. The rear end of the socket has connection by electrical conductors 18 to a suitable source of electric current. A focusing screw 19 passes through a hole in the outer shell and threaded into a bracket 20 on the socket, provides a means for focusing the lamp bulb. A spring 21 is received about the screw 19 between bracket 20 and shell 10 in order to hold the socket in adjusted position and provide for its forward movement.

My improved non-glare shade consists of a shell 25 comprising a quadri-spherical portion 26 having a semi-cylindrical portion 27 forming a continuation thereof. Portion 26 conforms generally to the surface of the lamp globe. The lower edges of the semi-cylindrical portion 27 are convexly curved, as shown at 28. The shell 25 partly surrounds the upper half of the lamp globe, and has a semi-circular opening 29 therein in which the neck of the globe is received.

A concave disk 32 is integrally connected by a spring arm 33 to the extreme forward end of the shell. This disk preferably has an aperture 34 therein through which the tip 35 of the incandescent globe is received. Light transmitting openings 36 are thus formed between the curved edges 28 and the disk 32.

In order to firmly hold the shade in position about the lamp globe, the shell is provided with slots 38 located radially with reference to the semi-circular opening 29, and adjacent the lower edges of the shell. A coil spring 39 has its end coils received in the slots 38, its middle portion being adapted to be retained behind a retaining lip 40, bent outwardly from and integrally formed with the lower edge of the disk 32.

In use the shade is slipped over the upper part of the lamp by forcing the disk 32 outwardly, through the medium of the spring arm 33, and allowing the same to spring back against the fore part of the globe in such manner as to permit the tip 35 to enter the aperture 34, the spring 39 having been previously looped over the globe. The median portion of the spring is placed behind the retaining lip 40, whereupon the two branches of the spring thus formed assume a curved form in contact with the globe. The socket 14 is then adjusted backward approximately to the limit of its movement by means of the focusing screw 19.

It will be observed that after the globe is thus positioned the quadri-spherical portion 26 and the semi-cylindrical extension 27 of the shell 25, prevent any light rays striking the upper part of the reflector. The light rays strike the lower portion of the reflector in such manner as to be reflected forward and downward so that they will fall upon the roadway at a predetermined distance in front of the vehicle, this distance being controlled by the forward and back adjustment of the globe. The disk 32 prevents the intensely bright filament being visible, and further cuts off all direct rays except those projected in a downward direction. Such rays of light as pass through the openings 36 strike the reflector at the sides, whereupon they are reflected to opposite sides of the roadway, which provides adequate non-glaring side illumination. The interior surfaces of the device preferably have a frosted or satin finish, that the light may be reflected thereby to the reflector in a diffused manner, which in turn reflects this diffused light to the roadway without any glaring effect.

My improved device forms a simple and effective means of preventing glare from automobile lamps, and is inexpensive to manufacture, the entire device consisting of but one single piece of formed sheet metal and a small spring.

What I claim as new and desire to secure by Letters Patent is:

1. In a device of the character described, the combination of a reflector, a lamp globe adjustably mounted therein, a shell inclosing part of said lamp globe, a concave disk having an aperture therein through which the tip of said lamp globe is received, a spring arm integrally connecting said disk with said shell, said shell having a semi-circular opening therein in which the neck of said lamp globe is received, and tension means to hold said shell about said globe.

2. In a device of the character described, the combination of a parabolic reflector, a lamp globe adjustable axially therein, a hood secured about said globe comprising a shall having a semi-circular opening therein in which the neck of said lamp globe is received, a concave disk having an aperture therein through which the tip of said lamp globe is received, a spring arm integrally connecting said disk with said shell, said shell having retaining means adjacent said semi-circular opening and a retaining lip on said disk, tension means to hold said shell about said globe and comprising a coil spring, the end coils of which are held by said retaining means and whose median portion is received behind said retaining lip.

3. In a device of the character described, a parabolic reflector, a lamp globe axially adjustable therein, a hood inclosing the upper part of said lamp globe and comprising a shell so devised as to permit light from said globe to be reflected only from the bottom and sides of said reflector and in a downward direction, a concave disk positioned before said globe and yieldably connected with said shell, whereby the direct forward light rays of said globe are reflected to said reflector, said disk and said shell having light transmitting openings therebetween whereby light is permitted to strike the sides of said reflector, light diffusing surfaces on the interior of said shell, said concave disk having an outwardly extending retaining lip on its lower end, a coil spring about said globe, the ends of which are secured to the rear edges of said shell and whose middle portion is retained behind said retaining lip, whereby said shell is firmly held in position about said globe.

OSCAR C. OLNEY.